US009806397B2

(12) United States Patent
Hopkins et al.

(10) Patent No.: US 9,806,397 B2
(45) Date of Patent: *Oct. 31, 2017

(54) SIGNAL TRACKING AND ANTENNA POSITIONING SYSTEM

(71) Applicant: TROLL SYSTEMS CORPORATION, Valencia, CA (US)

(72) Inventors: Jeff Hopkins, Valencia, CA (US); Julian Scott, Glendale, CA (US)

(73) Assignee: Troll Systems Corporation, Valencia, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/790,838

(22) Filed: Jul. 2, 2015

(65) Prior Publication Data

US 2015/0380803 A1 Dec. 31, 2015

Related U.S. Application Data

(63) Continuation of application No. 13/670,375, filed on Nov. 6, 2012, now Pat. No. 9,312,597.

(60) Provisional application No. 61/556,744, filed on Nov. 7, 2011.

(51) Int. Cl.

| | |
|---|---|
| ***H01Q 3/00*** | (2006.01) |
| ***G01S 13/00*** | (2006.01) |
| ***H01Q 1/12*** | (2006.01) |
| ***H01Q 3/08*** | (2006.01) |

(52) U.S. Cl.
CPC ............ *H01Q 1/1257* (2013.01); *H01Q 3/08* (2013.01)

(58) Field of Classification Search
CPC .................................. H01Q 3/08; H01Q 3/12
USPC .... 342/74, 359, 423, 442, 75; 343/754, 757, 343/766
See application file for complete search history.

(56) References Cited

U.S. PATENT DOCUMENTS

| | | | | |
|---|---|---|---|---|
| 4,035,805 A | | 7/1977 | Mobley | |
| 4,602,259 A | * | 7/1986 | Shepard | H01Q 1/125 33/268 |
| 4,752,780 A | * | 6/1988 | Pipkin | H01Q 1/125 343/760 |
| 5,309,162 A | | 5/1994 | Uematsu | |
| 6,043,788 A | * | 3/2000 | Seavey | H01Q 3/20 343/765 |
| 9,312,597 B2 | * | 4/2016 | Hopkins | H01Q 3/08 |
| 2009/0315760 A1 | | 12/2009 | Bafrooei | |
| 2011/0053607 A1 | | 3/2011 | Michael | |

* cited by examiner

*Primary Examiner* — Dao Phan
(74) *Attorney, Agent, or Firm* — EIP US LLP

(57) ABSTRACT

Embodiments disclosed herein relate to a communication system. Particularly disclosed are systems and methods for locating and tracking radio frequency signals and for automatically positioning an antenna to receive a desired radio frequency signal.

20 Claims, 6 Drawing Sheets

SIGNAL TRACKING AND ANTENNA POSITIONING SYSTEM

CROSS-REFERENCE TO RELATED APPLICATIONS

This Application is a continuation under 35 U.S.C. §120 of U.S. patent application Ser. No. 13/670,375, filed Nov. 6, 2012, which claims the benefit of U.S. Provisional Patent Application No. 61/556,744, filed on Nov. 7, 2011. The entire contents of each of the aforementioned applications are hereby incorporated by reference.

BACKGROUND OF THE INVENTION

Field of the Invention

The invention relates generally to the field of communications, and more particularly, to systems for identifying and tracking radio frequency transmission signals and for positioning an antenna toward targeted signals.

Description of the Related Technology

Depending on the application, one of several types of antennas can be utilized to implement a radio frequency (RF) link for a wireless communication system, wherein the RF link may transmit and/or receive audio, encapsulated data, compressed video, or other data. Types of antennas that may be used include omni, sector, and directional antennas. Those skilled in the art will understand that an omni antenna may radiate energy, for example, RF energy, approximately in, and receive energy approximately from, all directions (e.g., in a 360 degree azimuth). Those skilled in the art will also understand that a sector antenna may radiate or receive a cone of energy that is generally approximately between 50 and 120 degrees, and a directional antenna may radiate or receive a beam of energy within a much narrower angle in a determined direction with respect to the antenna. Directional antennas may have an angle of signal reception or transmission (i.e., a beam-width) that is less than that of a sector antenna and which is determined by the specific configuration of the directional antenna. The beam of energy transmitted or received by certain directional antennas may be referred to as a pencil beam because of its relatively narrow width as compared to the energy radiated by other types of antennas. Both sector and directional antennas need to be pointed, either manually or automatically, towards a target receive system or a source transmit system, as their beam-widths are less than 360 degrees. Directional antennas specifically require the most care as their beam-widths are typically less than about 10 degrees and in some cases less than about 1 degree.

Those skilled in the art will understand that the above antenna descriptions apply to both antennas used in transmit systems, as well as antennas used in receive systems. Many antennas can be used as either a transmit antenna or a receive antenna, or both, as in the case of a bi-directional link.

Between the output of a transmit antenna and the input of a receive antenna, the RF signal propagates through the air getting attenuated and bounced off terrain, buildings, and/or water. In order for a receive system to receive a desired signal, the signal typically must have enough power from the transmitter and gain from the receiver to overcome the attenuation due to air and satisfy the threshold signal level required by the receiver. In addition, the receive system must generally overcome natural and unnatural multi-path. Natural multi-path, which consists of bounced signals taking paths of varying lengths to get from the transmit antenna to the receive antenna, presents multiple images of the same signal at the receiver. Unnatural multi-path consists of undesired transmitted signals of the same, or similar, frequency and power levels as the desired signal. Unnatural multi-path may be an issue if multiple users are transmitting over the same, or similar, frequency simultaneously. The increasing prevalence of air to ground wireless communication, high-speed video, and data transmission is resulting in an increase in unnatural multi-path. In many areas of the world, environments are saturated in RF transmissions, thereby causing widespread interference.

Using an antenna with a narrowed beam-width may be required to minimize interference, as a narrowed beam-width corresponds with increased gain. Omni antennas generally have gains in the region of about 2 to 10 dBi (dBi refers to the relative gain/directivity of an antenna with respect to an equivalent isotropic antenna, which isotropic antenna radiates in all directions equally, expressed on the decibel logarithmic scale). Sector antennas generally have gains in the range of about 10 to 16 dBi. Directional antennas with beam-widths of less than about 10 degrees generally have a gain greater than about 20 dBi.

Selecting a receive antenna with a narrowed beam-width, for example a directional antenna, will generally allow a signal to be received from a greater distance, increase the strength of the received signal, and increase the resultant signal-to-noise ratio. The use of directional antennas, however, may limit the azimuth of signal reception since the beam-widths are typically less than about 10 degrees, and in some cases, less than about 1 degree. Careful positioning and continual adjustment of such antennas may be necessary to ensure proper signal reception. Presently, such positioning and adjustment is generally slow and often necessitates laborious input by a trained operator. These limitations may make directional antennas prohibitively cumbersome to use, particularly if the corresponding transmit or receive antenna is located on a moving device.

SUMMARY

One embodiment is a communication system that comprises an antenna module, a base, one or more motors, and processing circuitry, wherein: the antenna module comprises a receive antenna and a plurality of tracking antennas, the motors are configured to rotate the antenna module and/or tilt the receive antenna relative to the base, and the processing circuitry is configured to receive inputs from the tracking antennas and to control the motors based, at least in part, on these inputs.

Another embodiment relates to a method for positioning a receive antenna with a narrowed beam-width such that the antenna can receive a desired RF signal. The method comprises selecting a center frequency for signal reception, receiving a signal at or near the center frequency at a plurality of tracking antennas, detecting the strength of the signal at the tracking antennas, determining whether the strength of the signal is equal at each tracking antenna, moving the plurality of tracking antennas and the receive antenna if the strength of the signal is not equal at the tracking antennas, and repeating the steps of detecting, determining, and moving until the strength of the signal at the tracking antennas is equal. The method described above may be repeated to maintain the receive antenna's alignment with the signal over time.

DETAILED DESCRIPTION OF CERTAIN INVENTIVE EMBODIMENTS

A need exists for improved wireless communication systems and methods, for example for use with the transmission and reception of RF signals. In many applications, for example, the military, a particular need exists for mobile antennas capable of being set up quickly and simply. These antennas may be required to track and receive signals at designated radio frequencies, often in environments saturated in RF transmissions where there is widespread signal interference. Presently, omni antennas are often used, because they may be set up quickly and easily to begin receiving signals. The use of omni antennas, however, is not ideal, because they have a relatively low signal-to-noise ratio and are particularly prone to signal interruptions due to interference. While use of directional antennas would improve the signal-to-noise ratio and increase the received signal strength, such use is often impractical since current directional antenna systems may require laborious positioning.

Various embodiments provide for a communication system designed to overcome these current limitations. For example, in various embodiments, the communication system comprises a directional receive antenna and is configured to track an RF signal, and adjust the positioning of the directional receive antenna, automatically. As a result of the various embodiments, a receive antenna may receive a desired RF signal without manual or user-driven positioning even when the receive antenna comprises a directional antenna.

Figure 1A:
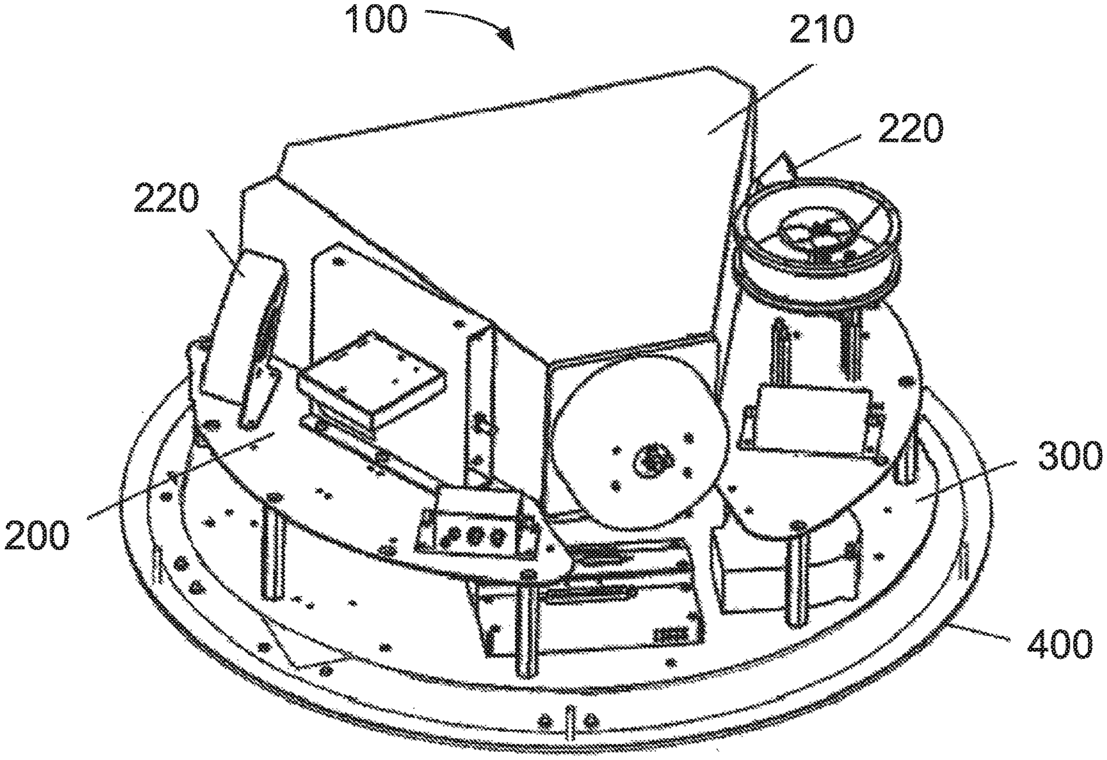
FIG. 1A is a perspective view of an embodiment of a communication system.
Figure 1B:
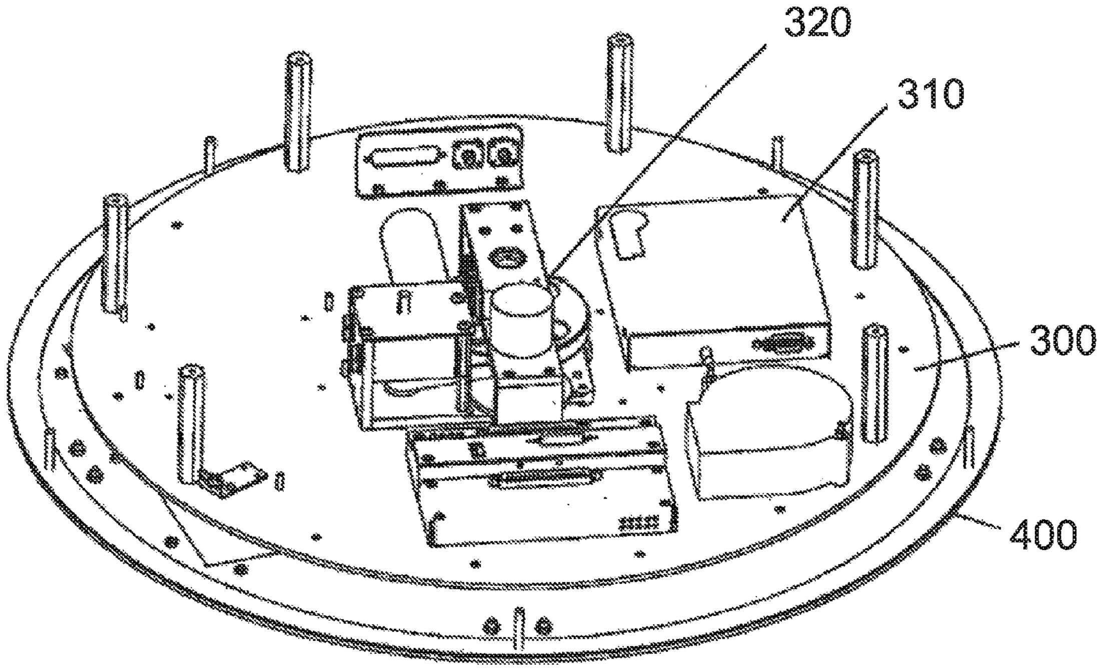
FIG. 1B is a perspective view of the embodiment of the communication system of FIG. 1A with a removable antenna module removed.

In various embodiments, such as the embodiment of a communication system depicted in the perspective views of FIGS. 1A and 1B, a communication system 100 comprises an antenna module 200, a base 400, and processing circuitry 310, wherein the antenna module comprises a receive antenna 210 and a plurality of tracking antennas 220.

Figure 3:
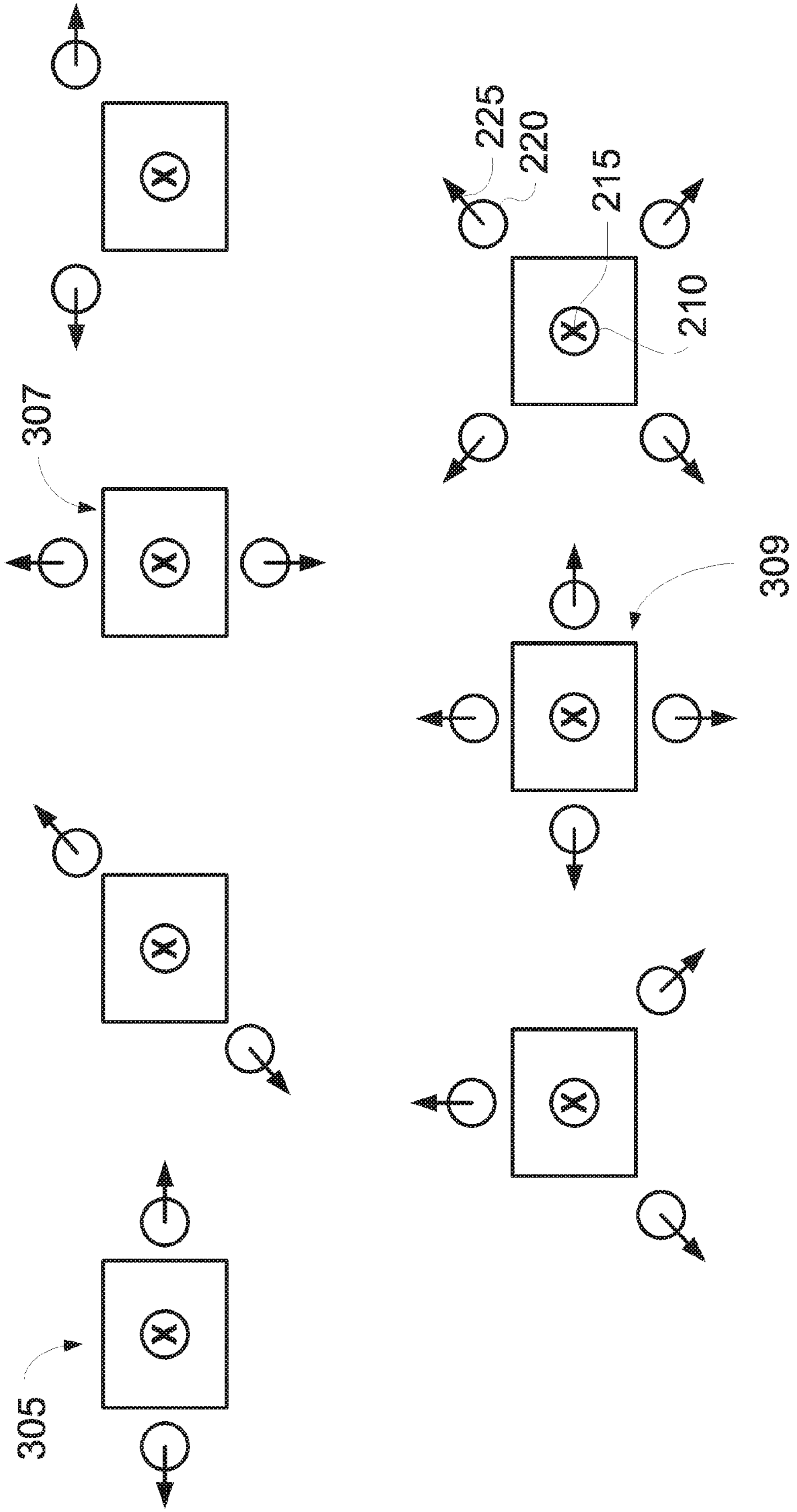
FIG. 3 is a conceptual diagram of various configurations of signal reception and tracking antennas.

In one embodiment, the receive antenna 210 is configured to receive signals within a receive antenna signal reception cone and the plurality of tracking antennas 220 are configured to receive signals within a corresponding plurality of tracking antenna signal reception cones. Each signal reception cone defines the directional limits in which each respective antenna is configured to receive a signal. FIG. 3 is a conceptual diagram of various positions and configurations for the placement of the receive antenna 210 and tracking antennas 220, and the corresponding direction of their signal reception cones, 215 (for the signal reception antenna) and 225 (for the tracking antennas). In various embodiments, the reception and tracking antennas may be positioned with respect to one another such that the direction of the center of the receive antenna signal reception cone is located equidistantly and equiangularly from the direction of the center of each of the tracking antenna signal reception cones, and each of the tracking antenna signal reception cones overlap, in part, with the receive antenna signal reception cone. The tracking antennas may be sector directional antennas while the receive antenna may be a narrow beam directional antenna so that the reception cones of the tracking antennas are wider than the reception cone of the receive antenna.

In some embodiments, there is one pair of tracking antennas. In other embodiments, there may be three or more tracking antennas. The tracking antennas may be located on top, below, near the side perimeters of, or at the corners of the receive antenna. In some embodiments, the tracking antennas are located in proximity, but not connected, to the receive antenna. In other embodiments, the tracking antennas and the receive antenna may be in contact. In FIG. 1A, the tracking antennas 220 are located in proximity to the receive antenna 210, near the receive antenna's side perimeters and are pointed in an equally offset directional orientation from the orientation of the receive antenna 210.

Figure 2A:
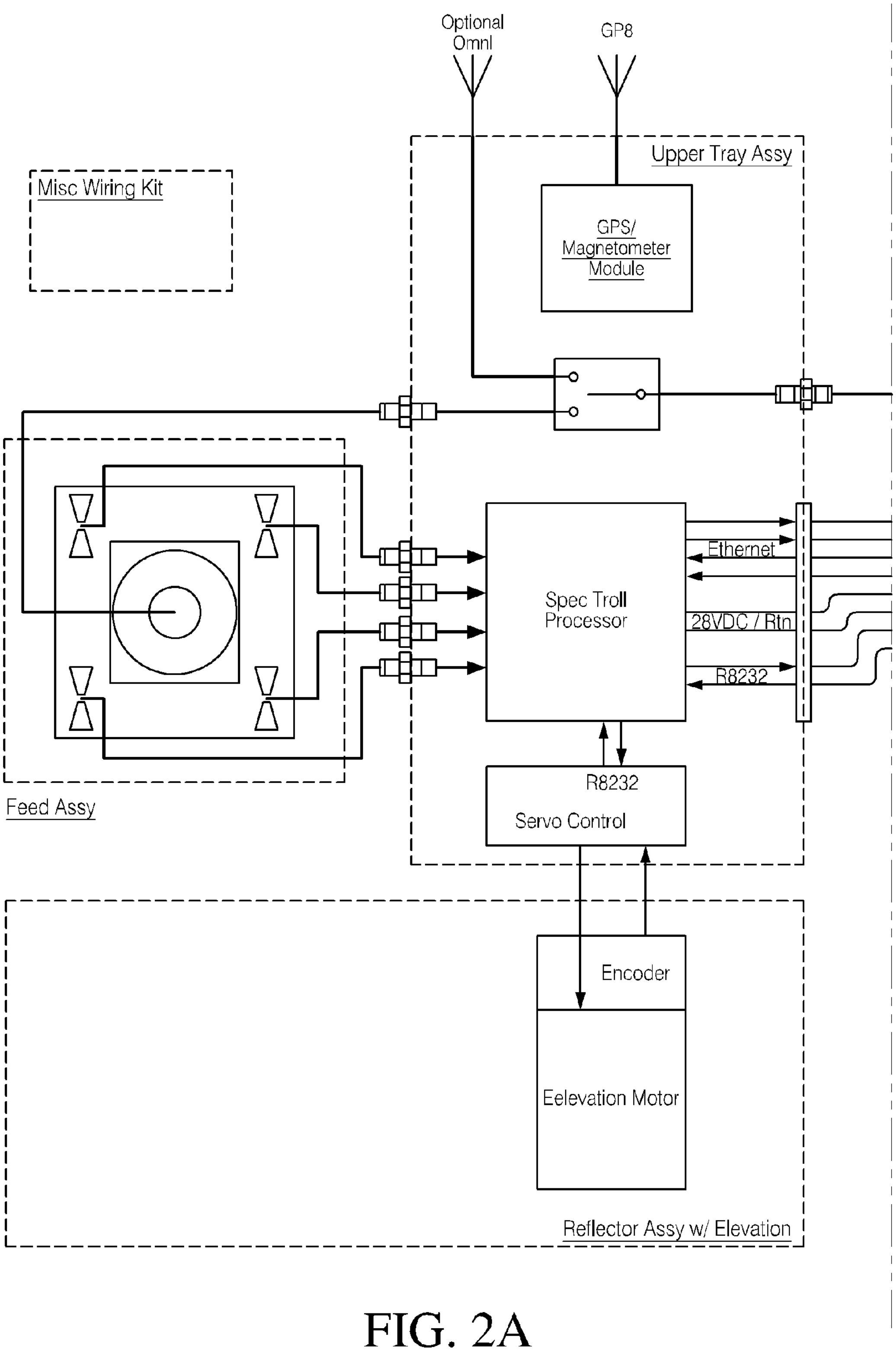
FIG. 2A is a block diagram of an embodiment of part of a communication system.
Figure 2:
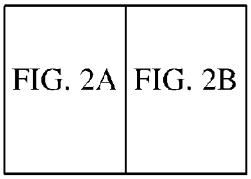
FIG. 2B is a block diagram of an embodiment of part of a communication system. Herein, FIGS. 2A and 2B may be referred to collectively as FIG. 2.
Figure 2B:
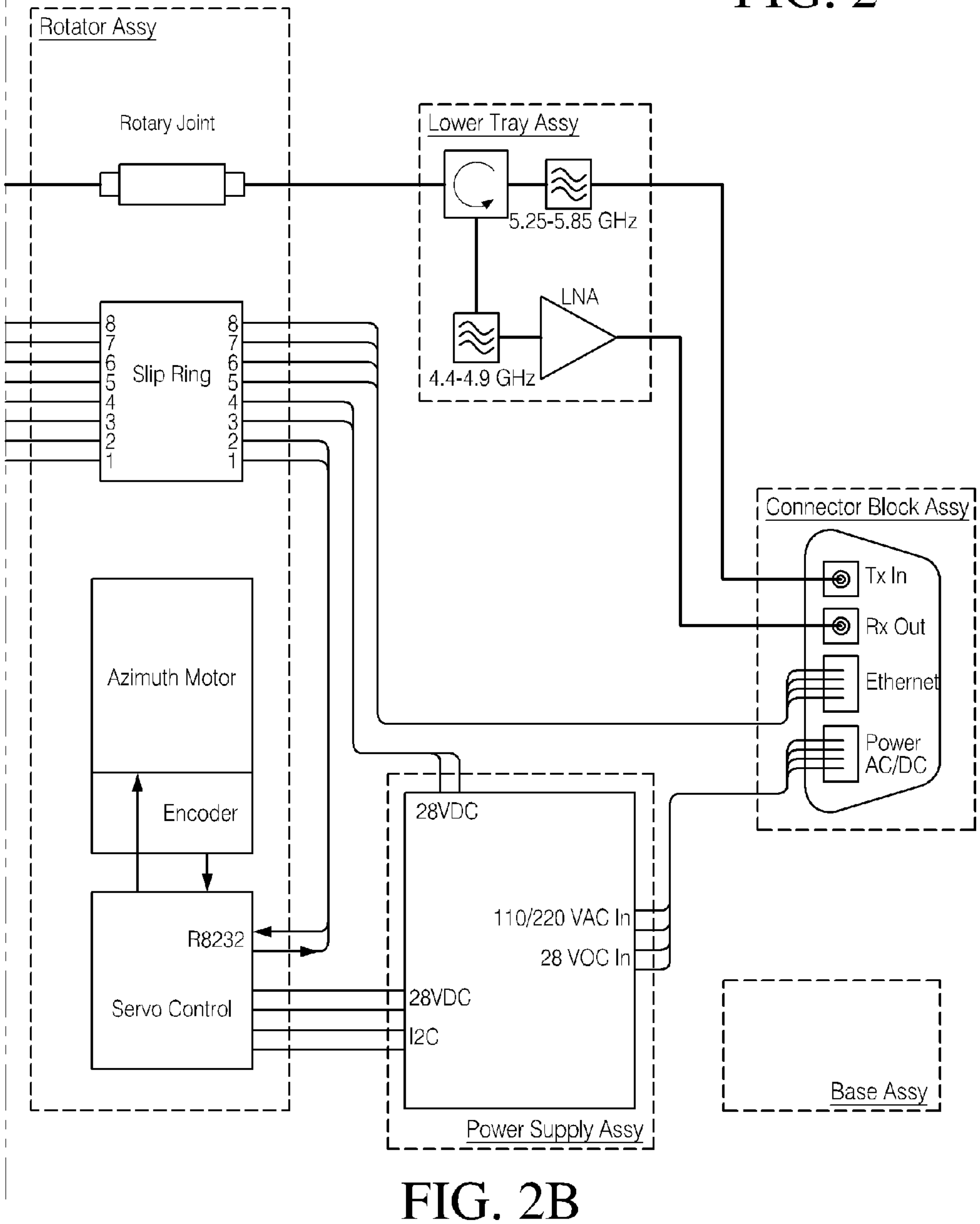

In various embodiments, such as the embodiment represented in the block diagram of FIG. 2, the communication system 100 comprises one or more motors. Such motors may include an azimuthal motor 340 and an elevation motor 320. In some embodiments, the base 400 is stationary, and the antenna module 200 is configured to rotate axially relative to the base. In such embodiments, the azimuthal motor 340 provides for the rotational movement of the antenna module. The azimuthal motor may be located between the base 400 and the upper tray 300. In such embodiments, the antenna module 200 and the upper tray 300 rotate together axially relative to the base 400. A slip ring 350 is configured to maintain electrical connections during azimuthal rotation. In some embodiments comprising a stationary base, the antenna module is not only rotatable but also removable; in others, a portable unit comprising the antenna module and the components of the upper tray is removable. In still other embodiments, there may be no removable parts.

An elevation motor 320 may be positioned and configured to tilt the receive antenna 210 and tracking antennas 220 upward or downward. The elevation motor may also be configured to tilt the entire antenna module 200 upward or downward, and may be positioned and configured to tilt both the antenna module 200 and the upper tray 300. It will be appreciated by those of skill in the art that communication system 100 may have one or both of the azimuthal and elevation motors.

As shown in FIGS. 1B and 2, various embodiments comprise processing circuitry 310 configured to receive inputs at least from the tracking antennas and to control the motors based, at least in part, on the inputs. An embodiment of the communication system may further comprise a wired or wireless connection to a user interface. Using the interface, a user may select a center frequency that the user wishes to track. This information is received as an additional input by the processing circuitry 310. In various embodiments, the processing circuitry comprises a spectrum analyzer. In these embodiments, the tracking antennas may receive RF energy over a wide range of frequencies, and the spectrum analyzer is configured to determine the amount of received energy over a large number of specific frequencies or frequency bands within this broad range. The spectrum analyzer may be configured to separately determine and monitor the energy received by each of the separate tracking antennas 220 at or near the center frequency selected by the user. This information can then be used to position the receive antenna properly to receive the signal at the user selected center frequency as described further below. Since only the relative signal strength at the selected center frequency at each of the tracking antennas is required for some embodiments of the tracking and positioning method described herein, tracking can be performed without the need to demodulate the signals received by the tracking antennas. In fact, no knowledge of the modulation scheme used by the transmitter may be necessary to successfully track the selected signal.

In various embodiments, the processing circuitry 310 uses the inputs from a plurality of tracking antennas 220 to determine whether the signal strength at the selected center frequency is equal across the tracking antennas. If the signal strength of the center frequency is not equal across the tracking antennas, the processing circuitry will send an output to one or more motors. In some embodiments, such as the one shown in FIG. 2, the processing circuitry further comprises an azimuthal control unit 345. In such embodiments, when the signal strength of the center frequency is not equal across the tracking antennas, the azimuthal control unit may output instructions to the azimuthal motor 330 to rotate axially. Rotation of the azimuthal motor 330 will cause the antenna module 200 to rotate, and will thus, reposition the receive antenna 210 and tracking antennas 220. In some embodiments, the processing circuitry further comprises an elevation control unit 325. In such embodiments, when the signal strength of the center frequency is not equal across the tracking antennas, the elevation control unit 325 may output instructions to the elevation motor 320 to move. Movement of the elevation motor 320 may cause the receive antenna 210 and tracking antennas 220 (or the entire antenna module 200) to tilt upward or downward. Embodiments may be configured for automated tracking in only one of the azimuthal and elevational degrees of freedom rather than both. For example, the tracking antennas may only change azimuthal orientation with the receive antenna, but not elevational orientation, such as in the embodiment shown in FIGS. 1A and 1B. In some such embodiments, the elevation motor may tilt the receive antenna upward and downward independent of the tracking antennas and in response to manual user inputs.

In various embodiments, the processing circuitry may continue to send output instructions controlling the movement of the motors until the signal strength at each of the plurality of tracking antennas is substantially equal.

Referring again to FIG. 3, the processing circuitry can be configured to control the motor(s) to move the antennas in a direction toward the tracking antenna with the strongest signal at the selected frequency. For example, as shown in configuration 305 of FIG. 3, the tracking antennas are pointed outward slightly from the receive antenna. The tracking antenna with the stronger signal is pointed in an azimuthal direction more toward the desired signal, and the azimuthal motor can be driven to rotate the antennas toward this tracking antenna until the received signal strength at both the tracking antennas is the same. This configuration can be used for a unit with only automated azimuthal control. The same principles can be applied for elevation control with the arrangement of configuration 307. Configuration 309 combines these two for both automated azimuthal control and automated elevation control.

Figure 4:
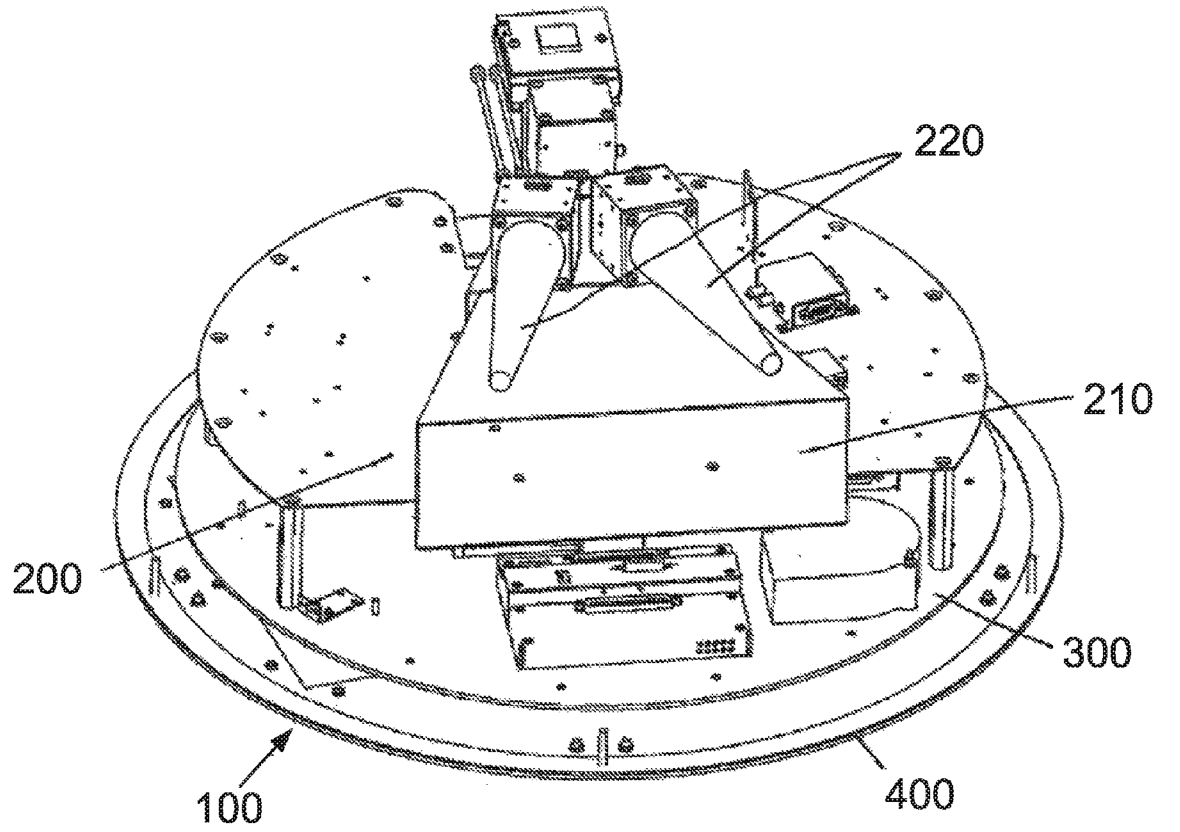
FIG. 4 is a perspective view of another embodiment of a communication system.

FIG. 4 provides a perspective view of another embodiment of a communication system. In this embodiment, there are two tracking antennas 220 oriented opposite one another relative to a receive antenna 210. The tracking antennas are located on top of, and connected to, the receive antenna. The tracking antennas are positioned such that the receive antenna signal reception cone is located equidistantly and equiangularly from each of the tracking antenna signal reception cones. The tracking antennas are further positioned such that tracking antenna signal reception cones overlap, partly, with the receive antenna signal reception cone. Additionally, in the depicted embodiment, the elevation motor 320 is positioned and configured to tilt both the receive antenna and the tracking antennas. The azimuthal motor is positioned and configured to rotate both the antenna module 200 and the upper tray 300 relative to the base 400. With the configuration of this embodiment, the processing circuitry may be able to receive inputs in the form of RF signals from the pair of tracking antennas, calculate the differences in signal strength, and rotate and/or tilt the antennas until they reach a position in which the signal received by each tracking antenna is equal in strength.

In an embodiment of the communication system, the processing circuitry may also output via an Ethernet output 385 for example, the signal strength received by one or more of the tracking antennas over a broad range of frequencies. This can be displayed as a graphical output as is conventional with spectrum analyzers on a display device connected to the system at the connector block assembly 380. This can be used by a user of the system to view the center frequencies and strengths of a variety of received signals. The center frequency to be tracked can be selected based at least in part on this information. In some cases, this information can be used to deduce modulation characteristics of various received signals.

In several embodiments, the communication system positions a receive antenna to receive a desired RF signal through a method comprising: receiving a frequency signal at a plurality of tracking antennas, detecting the strength of the desired frequency signal at the plurality of tracking antennas, determining whether the strength of the desired frequency signal is equal between the plurality of tracking antennas, moving the plurality of tracking antennas and the receive antenna if the strength of the desired frequency signal is not equal, and repeating the steps of detecting, determining, and moving until the strength of the desired frequency signal is equal. The steps may further be repeated to update the position of the receive antenna in order to keep the receive antenna locked onto the desired frequency signal.

What is claimed is:

1. A method for operating an antenna system comprising an antenna module connected to a base, the method comprising:

receiving a signal at a first directional tracking antenna attached to the antenna module, wherein the first directional tracking antenna is configured to receive wireless signals within a first signal reception cone;

receiving the signal at a second directional tracking antenna attached to the antenna module, wherein the second directional tracking antenna in configured to receive wireless signals within a second signal reception cone;

receiving the signal at a directional receive antenna attached to the antenna module, wherein the directional receive antenna is configured to receive wireless signals within a third signal reception cone;

calculating a first tracking signal strength of the signal as received by the first directional tracking antenna;

calculating a second tracking signal strength of the signal as received by the second directional tracking antenna;

calculating a difference between the first tracking signal strength and the second tracking signal strength; and rotating the antenna module relative to the base in order to increase a receive signal strength of the signal as received by the directional receive antenna.

2. The method of operating the antenna system of claim 1, wherein rotating the antenna module comprises sending control signals from processing circuitry to an azimuthal motor configured to rotate the antenna module relative to the base.

3. The method of operating the antenna system of claim 2, further comprising tilting the antenna module relative to the base in order to increase the receive signal strength of the signal as received by the directional receive antenna.

4. The method of operating the antenna system of claim 3, wherein tilting the antenna module comprises sending control signals from the processing circuitry to an elevation motor configured to tilt the antenna module relative to the base.

5. The method of operating the antenna system of claim 1, wherein the third signal reception cone is equidistant and equiangular from the first and second signal reception cones, and the first and second signal reception cones overlap, in part, with the third signal reception cone.

6. The method of operating the antenna system of claim 1, further comprising calculating the difference between the first tracking signal strength and the second signal tracking strength within a selected frequency band.

7. The method of operating the antenna system of claim 1, wherein calculating the first tracking signal strength, calculating the second tracking signal strength, and calculating the difference between the first tracking signal strength and the second tracking signal strength is performed by processing circuitry comprising a spectrum analyzer.

8. The method of operating the antenna system of claim 1, wherein the first and second directional tracking antennas comprise sector directional antennas, wherein the directional receive antenna comprises a narrow beam directional antenna, and wherein the first and second signal reception cones of the respective first and second directional tracking antennas are wider than the third signal reception cone of the directional receive antenna.

9. The method of operating an antenna system of claim 1, wherein the first and second directional tracking antennas are located proximate to side perimeters of the directional receive antenna, and wherein the first and second directional tracking antennas are pointed in an equally offset directional orientation from an orientation of the directional receive antenna.

10. The method of operating an antenna system of claim 6, further comprising receiving an indication of the selected frequency band via a user interface.

11. A method of operating an antenna system comprising a base, a control processor, and an antenna module comprising a receive antenna and a plurality of tracking antennas, the method comprising:

receiving a signal within a receive antenna signal reception cone of the receive antenna;

receiving the signal within at least one tracking antenna signal reception cone of the plurality of tracking antennas;

calculating, by the control processor, a respective signal energy of the signal as received by each of the plurality of tracking antennas and the receive antenna; and sending, by the control processor, a first command signal to an azimuthal control unit in order to rotate the antenna module relative to the base and to reposition the receive antenna to increase the respective signal energy as received by the receive antenna.

12. The method of operating an antenna system of claim 11, further comprising sending, by the control processor, a second command signal to a tilt control unit in order to tilt the antenna module relative to the base and to reposition the receive antenna to increase the respective signal energy as received by the receive antenna.

13. The method of operating an antenna system of claim 11, further comprising sending additional command signals to the azimuthal control unit until the respective signal energy at each of the plurality of tracking antennas is substantially equal.

14. The method of operating an antenna system of claim 12, further comprising sending additional command signals to the tilt control unit until the respective signal energy at each of the plurality of tracking antennas is substantially equal.

15. The method of operating an antenna system of claim 11, wherein the receive antenna and the plurality of tracking antennas are positioned with respect to one another such that a direction of a center of the receive antenna signal reception cone is located equidistantly and equiangularly from a direction of a center of each of the at least one tracking antenna signal reception cone, and each of the at least one tracking antenna signal reception cone overlap, in part, with the receive antenna signal reception cone.

16. The method of operating an antenna system of claim 11, further comprising calculating, by the control processor, a difference between the respective signal energy as received by each of the plurality of tracking antennas within a selected frequency band.

17. The method of operating an antenna system of claim 16, further comprising receiving an indication of the selected frequency band via a user interface.

18. The method of operating an antenna system of claim 11, wherein calculating, by the control processor, the respective signal energy as received by each of the plurality of tracking antennas and the receive antenna is performed by a control processor comprising a spectrum analyzer.

19. The method of operating an antenna system of claim 11, wherein at least one of the plurality of tracking antennas comprises a sector directional antenna, and wherein the receive antenna comprises a narrow beam directional antenna.

20. The method of operating an antenna system of claim 19, wherein the at least one tracking antenna signal reception cone of the at least one sector directional antenna is wider than the receive antenna signal reception cone of the narrow beam directional antenna.

* * * * *